United States Patent
Gray, Jr.

(10) Patent No.: US 9,115,822 B2
(45) Date of Patent: Aug. 25, 2015

(54) REMOTE DRAIN PLUG SYSTEM

(76) Inventor: Eugene John Gray, Jr., Atascadero, CA (US)

( * ) Notice: Subject to any disclaimer, the term of this patent is extended or adjusted under 35 U.S.C. 154(b) by 344 days.

(21) Appl. No.: 13/611,496

(22) Filed: Sep. 12, 2012

(65) Prior Publication Data

US 2013/0221257 A1 Aug. 29, 2013

Related U.S. Application Data

(60) Provisional application No. 61/634,276, filed on Feb. 27, 2012.

(51) Int. Cl.
*F16K 31/00* (2006.01)
*F16K 31/46* (2006.01)
*F16K 31/44* (2006.01)

(52) U.S. Cl.
CPC ............. *F16K 31/465* (2013.01); *F16K 31/445* (2013.01); *Y10T 137/0491* (2015.04)

(58) Field of Classification Search
CPC ..... F16K 31/46; F16K 31/445; F16K 31/465; F16K 1/38; Y10T 137/0491
USPC ......... 251/294, 279; 114/197–198; 137/15.18
See application file for complete search history.

(56) References Cited

U.S. PATENT DOCUMENTS

| | | | | |
|---|---|---|---|---|
| 1,081,776 A | * | 12/1913 | Saunders | 251/294 |
| 1,091,843 A | * | 3/1914 | Hogg | 123/25 A |
| 1,158,401 A | * | 10/1915 | Empson | 181/197 |
| 1,498,859 A | * | 6/1924 | Wekerle | 123/327 |
| 1,513,481 A | * | 10/1924 | Brede | 137/384.6 |
| 3,537,679 A | * | 11/1970 | Bulnes et al. | 251/144 |
| 4,203,468 A | * | 5/1980 | Dietz | 137/624.11 |
| 5,462,254 A | * | 10/1995 | Muller | 251/144 |
| 5,724,908 A | | 3/1998 | Murray | |

* cited by examiner

*Primary Examiner* — Marina Tietjen
(74) *Attorney, Agent, or Firm* — Thomas D. Foster; Bruce Hare (57) ABSTRACT

A remote drain plug system is described. The system includes a control cable having an inner wire and an outer layer, a cable actuator coupled to a first end of the control cable, the cable actuator adapted to move the inner wire within the outer layer, a drain plug housing coupled to a second end of the control cable, and a drain plug coupled to the inner wire at the second end of the control cable, the drain plug adapted to be able to be positioned relative to the drain plug housing. A method of operating the remote drain plug system includes providing an actuator controller, receiving a selection of "open" from the actuator controller, and extending the remote drain plug away from a drain plug housing such that water is able to flow through the drain plug housing.

14 Claims, 6 Drawing Sheets

REMOTE DRAIN PLUG SYSTEM

CROSS-REFERENCE TO RELATED APPLICATIONS

This application claims priority to U.S. Provisional Patent Application Ser. No. 61/634,276, filed on Feb. 27, 2012.

BACKGROUND

Typically, boats or other water vessels have a drain plug located in the lower area of the structure to allow removal of water in the vessel (i.e., when the drain plug is removed from a drain plug housing) and prevent water from entering the vessel when in use (i.e., when the drain plug is inserted into a drain plug housing). Drain plugs may be manually installed before entering a body of water and manually removed after leaving a body of water.

Current drain plugs are very difficult to install once a vessel has already been placed in a body of water. Many existing drain plugs can only be installed and/or removed from outside of the vessel. Furthermore, many drain plugs are not permanently attached to the vessel, thereby making it possible to lose or misplace the drain plug. A missing drain plug could subsequently cause a vessel to take on water and even possibly sink.

Accordingly, there exists a need for a remote drain plug system that can be permanently attached to water vessels, and which can be controlled remotely by an operator of the vessel, thereby allowing the drain plug to easily prevent the flow of water and/or release water, as needed.

BRIEF SUMMARY

Some embodiments provide a way to prevent the flow of water into, and release water from, a water vessel. The present invention may provide various structural components that may be assembled to form a device that may also be disassembled into component parts. Such structural components may be configured in various different ways (e.g., having different circumferences, sizes, weights, materials, connection schemes, different numbers of sub-elements, etc.) for various different applications, as appropriate. Some embodiments may provide drain plug systems that are able to be operated by a remote control feature. The systems may include various appropriate elements that include various appropriate materials and which may allow for installation of the system in a vessel.

In addition, the devices and systems may be able to be reconfigured in various different ways (e.g., additional and/or substitute components may be provided such that a structure may be adapted to suit various alternative configurations, the components of a structure may be able to be connected in various different ways, etc.). For instance, if the drain plug system is to be removed from one vessel and installed into another, various components may be provided to allow the system to be appropriately installed in a different configuration in the new vessel.

Some embodiments of the invention provide a remote drain plug system including a control cable having an inner wire and an outer layer, a cable actuator coupled to a first end of the control cable, the cable actuator adapted to move the inner wire within the outer layer, a drain plug housing coupled to a second end of the control cable, and a drain plug coupled to the inner wire at the second end of the control cable, the drain plug adapted to be able to be positioned relative to the drain plug housing.

Alternative embodiments of the invention provide a method of installing a remote drain plug system into a water vessel. The method includes connecting a drain plug and drain plug housing to one end of a control cable, inserting the control cable, drain plug and drain plug housing into a receptacle in the water vessel, mounting a cable actuator to a structure of the vessel, and attaching the cable actuator to another end of the control cable.

Other alternative embodiments of the invention provide a method of operating a remote drain plug system of a water vessel. The method includes providing an actuator controller, receiving a selection of "open" from the actuator controller, and extending the remote drain plug away from a drain plug housing such that water is able to flow through the drain plug housing.

The preceding Summary is intended to serve as a brief introduction to some embodiments of the invention. It is not meant to be an introduction or overview of all inventive subject matter disclosed in this document. The Detailed Description that follows and the Drawings (or "Figures" or "FIGS.") that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matter is not to be limited by the illustrative details in the Summary, Detailed Description and the Drawings, but rather is to be defined by the appended claims, because the claimed subject matter may be embodied in other specific forms without departing from the spirit of the invention.

BRIEF DESCRIPTION OF THE DRAWINGS

The novel features of the invention are set forth in the appended claims. However, for purpose of explanation, several embodiments of the invention are set forth in the following drawings.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Several more detailed embodiments of the invention are described in the sections below. Section I describes various components of the structure used by some embodiments.

Section II then describes a method of installation that may be provided by some embodiments. Lastly, Section III describes methods of operation provided by some embodiments.

I. Components

Figure 1:
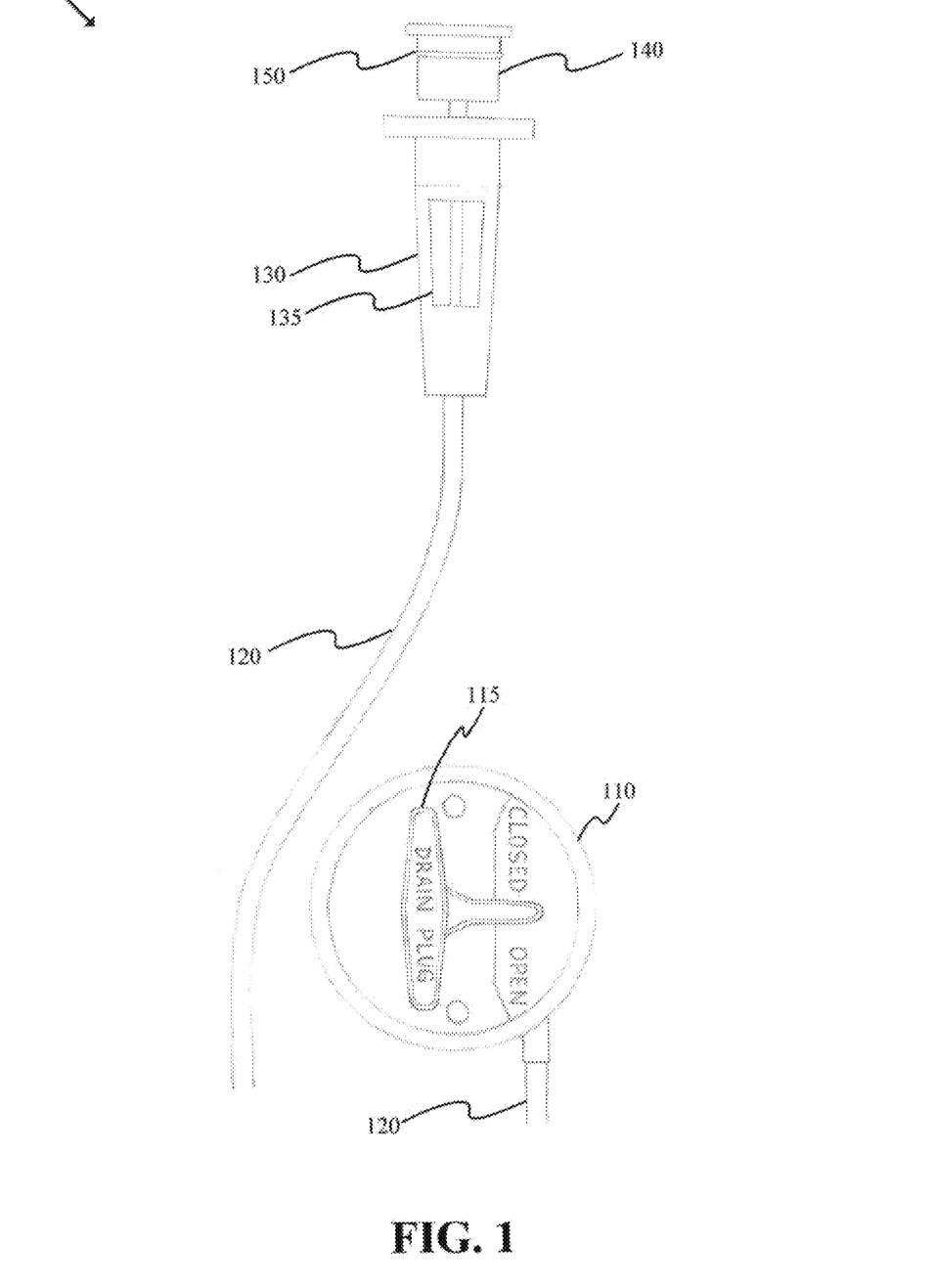
FIG. 1 illustrates a side view of a remote drain plug system according to an exemplary embodiment the invention.

FIG. 1 illustrates a front view of a remote-controlled drain plug system 100 of some embodiments. Specifically, this figure shows various components that may be included in the remote-controlled drain plug system. As shown, the remote-controlled drain plug system may include a cable actuator 110 with a controller 115, control cable 120, drain plug housing 130 with one or more drain cavities 135, and a drain plug 140 that may include an O-ring 150. The cable actuator 110 may be adapted to control the position of the drain plug 140. The cable actuator 110 may include one or more actuator controllers 115 (e.g., one or more knobs, buttons, levers, etc.). The control cable 120 may be adapted to connect the cable actuator to the drain plug 140. The drain plug housing 130 may be adapted to be positioned within a drain plug space provided by a water vessel. The drain plug 140 and O-ring 150 may be adapted to form a water tight seal (with the drain plug housing 130) along an external surface of the water vessel.

The cable actuator 110 may attach to the control cable 120, which in turn may attach to the drain plug 140 through the drain plug housing 130. The O-ring 150 may attach to the drain plug 140 (and/or be integrally formed with the drain plug) to form a seal with the drain plug housing 130. The cable actuator 110 may include a control knob (and/or other appropriate control feature, such as a button, lever, etc.) that may, for example, rotate in one direction to engage the device to a "closed" position and rotate in an opposite direction to an "open" position. The cable actuator may be appropriately secured to one end of the control cable 120 via, for example, an actuator mounting bracket to allow water (and/or other fluids) to flow through the drain plug housing 130 when the cable actuator 110 is in the "open" position. Alternatively, the cable actuator may be switched to the "closed" position via the control knob to prevent the flow of water (and/or other fluids) through the drain plug housing 130. The cable actuator 110 may include various appropriate materials (e.g., acrylonitrile butadiene styrene (ABS), brass, etc.).

The control cable 120 may include various appropriate materials and may be configured such that the cable has appropriate rigidity to operate a drain plug and appropriate flexibility such that the cable may be able to be positioned in various configurations through a vessel (e.g., the cable may be flexible enough such that it is able to be routed through various chase ways, passage ways, etc.). The control cable 120 may be made in various appropriate thicknesses and/or lengths, as appropriate (e.g., a control cable for a larger vessel may be longer and thicker than a control cable for a smaller vessel). Some embodiments may include a control cable with various appropriate fastening elements adapted to allow portions of the control cable to attach to various appropriate parts of a vessel.

The control cable 120 may include an inner and outer conduit. The inner conduit may include a wire (and/or other appropriate element, such as a cable, line, etc.) made from stainless steel and/or other appropriate materials. The outer conduit may include three layers, which may include a core, a support layer, and an outer layer. The core layer may include nylon, which may facilitate proper functioning of the inner wire (e.g., by providing a low-friction surface). The support layer may include various wires and/or other support structures positioned laterally from the direction of the control cable to support and strengthen the control cable structure. The outer layer may encase the core and support layer of the outer conduit, as well as the inner conduit, and may include Polyethylene and/or other appropriate material(s).

The control knob 115 (or other control feature) of the cable actuator 110 may connect to the inner wire of the control cable 120 in various appropriate ways. For example, the control knob 115 of the cable actuator 110 may connect to the inner wire via a "Z" bend, and/or other appropriate ways (not shown). In some embodiments, the actuator controller 115 may include a rigid arm or other appropriate element that protrudes from the opposite side of the actuator 110 than the controller 115. For example, the knob 115 of FIG. 1 may revolve about a center axis, while on the opposite face of the actuator, an associated arm may revolve about the same center axis. In such a way, when the control knob is turned in a first direction (e.g., clockwise), the arm may move in such a way that the inner wire moves in a first direction along the control cable 120 and the drain plug 140 is extended out of the housing 130. Likewise, when the control knob is turned in a second direction (e.g., counter-clockwise), the arm may move in such a way that the inner wires moves in a second direction along the control cable 120 and the drain plug 140 is retracted into the housing 130.

The drain plug housing 130 may include various appropriate materials and may be configured such that it may be able to be positioned in a space (e.g., a hole) on an exterior surface of a water vessel. The drain plug housing may include various components adapted to allow it to connect to one end of the control cable 120. For example, the drain plug housing 130 may include a threaded cavity allowing one end of the control cable 120 to screw into the drain plug housing 130. Some embodiments may include a drain plug housing 130 with elements allowing it to form a water tight seal with a vessel it is attached to.

The one or more drain plug cavities 135 may allow fluid to flow through the drain plug housing 130 and out of the vessel, when the drain plug 140 is in an "open" position. Each drain plug cavity 135 may include one or more inlets and one or more outlets. In the example of FIG. 1, the inlets and outlets are formed integrally with the cavity. Such cavities may be sized, located, and/or otherwise configured in various appropriate ways. The attributes of the cavities may be at least partly based on the type of vessel, size of drain plug housing 130, position of the housing within the vessel, and/or other appropriate factors.

The drain plug 140 may be composed of various appropriate materials and may be adapted to form a water tight seal with an outlet of the drain plug housing 130. The drain plug housing may include an O-ring 150, which may include silicone and/or any other appropriate material. The O-ring may be adapted to fit securely on the drain plug 140 and may form a water tight seal between the drain plug and drain plug housing 130, thereby preventing the flow of water through the drain plug housing when the cable actuator 110 is in the "closed" position. Alternative embodiments may include a drain plug 140 that includes an O-ring 150 that is integrally formed with the drain plug 140. The drain plug may be configured to be various sizes, lengths, thicknesses, etc., which may adapted to fit into various types of water vessels. For example, larger drain plugs may be used for larger water vessels while smaller drain plugs may be used for smaller water vessels.

During operation, a user may, for example, want to cause the drain plug 140 to move from a closed to an open position. The user may turn the cable actuator 110 from a closed position to an open position. The actuator, in turn, may cause the inner wire of the control cable 120 to extend away from the actuator 110. The inner wire may, in turn, cause the drain plug 140 to move out of and away from the drain plug housing 130, thus releasing a water tight seal that may have been formed by the O-ring 150 contacting an inner surface of the drain plug housing 130. In this way, fluid may be allowed to pass through the drain plug housing, flowing into the cavities 135 and exiting a receptacle for the drain plug 140 (e.g., retained water may be drained from the boat). When the user wants to cause the drain plug 140 to move from an open to a closed position, the user may turn the cable actuator 110 from an open position to a closed position. The actuator, in turn, may cause the inner wire of the control cable 120 to retract into the actuator 110. The inner wire may, in turn, cause the drain plug 140 to move into the drain plug housing 130, thus forming a water tight seal that may be formed by the O-ring 150 contacting an inner surface of the drain plug housing 130. In this way, fluid may be prevented from passing through the drain plug housing.

One of ordinary skill in the art will recognize that system 200 may be implemented in various different ways without departing from the spirit of the invention. For instance, several embodiments were described above by reference to particular features and/or components (e.g., operations including turning the cable actuator 110 to change states of the system, having a control cable inner wire 230 connecting to the control knob of the cable actuator 110 via a "Z" bend, etc.). However, one of ordinary skill in the art will realize that other embodiments might be implemented with other types of features and components (e.g., operation by other types of control elements, such as buttons, levers, switches, etc., having a control cable inner wire 230 connecting to the cable actuator by screw, eyelids and pins, and/or any other appropriate way, etc.).

Figure 2:
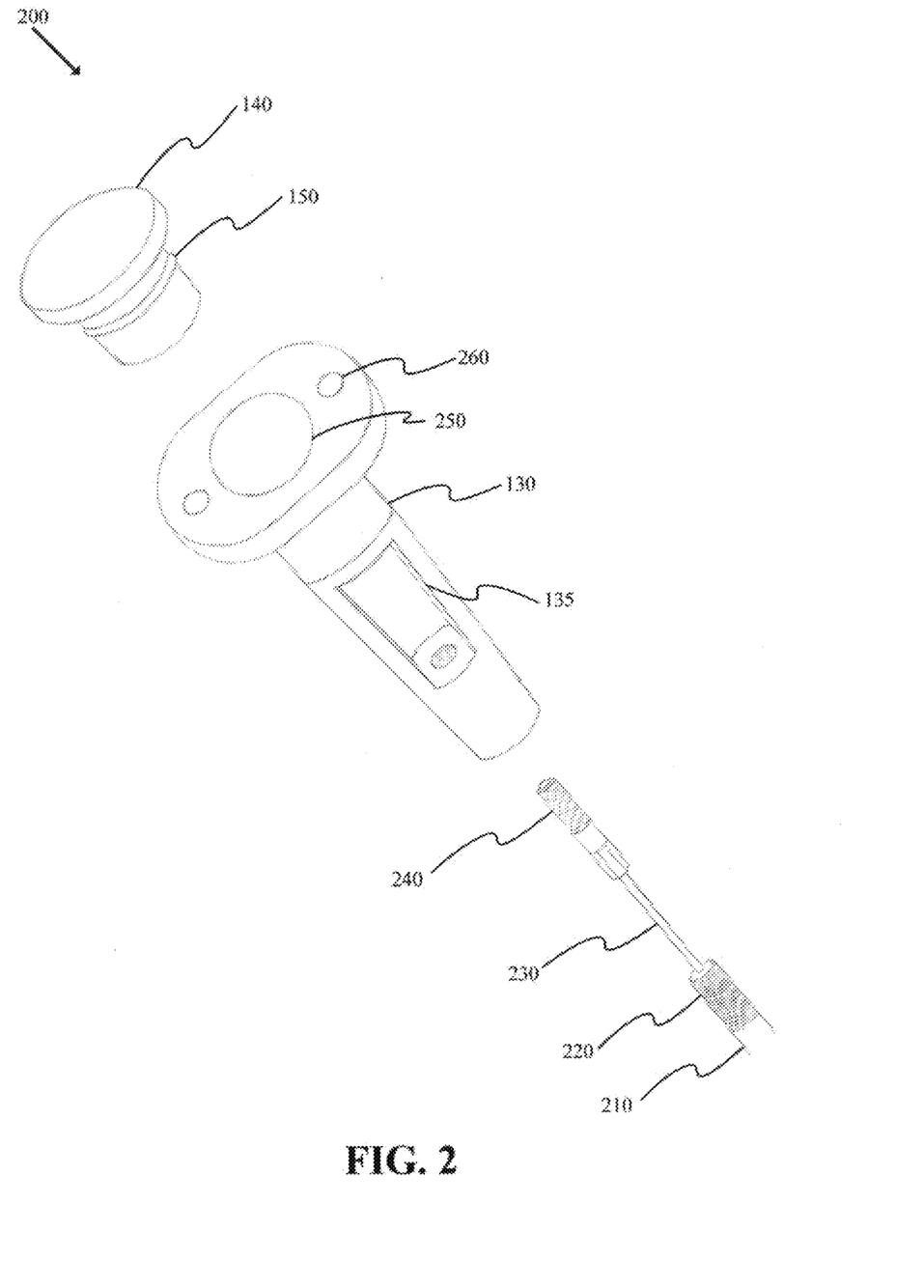
FIG. 2 illustrates a perspective view of a control cable, drain plug housing, and drain plug of the system of FIG. 1.

FIG. 2 illustrates a perspective view 200 of the control cable 120, drain plug housing 130, and drain plug 140 of some embodiments of the device of FIG. 1. Specifically, this figure shows various components of the control cable 120 that may be used to connect to other components of the remote-controlled drain plug system. As shown, the cable 120 may include an outer conduit 210 with a control cable actuator end 220, a control cable inner wire or conduit 230, and a control cable connector 240.

The control cable 120 may be adapted so that the control cable actuator end 220 connects to the drain plug housing 140 at one end of the cable 120. Such a connection may be made in various appropriate ways (e.g., the actuator end 220 may be threaded to connect to a matching thread provided in the drain plug housing 130, the end 220 may form a compression fit with an opening of the drain plug housing, etc.). At the other end of the cable, another cable actuator end 220 may be provided such that the outer conduit 210 may connect to the actuator 110 and thus be held in a fixed position relative to the actuator 110 and drain plug housing 130. Such a connection may be made in various appropriate ways (e.g., using one or more fasteners to secure the actuator end 220 to a fixed protrusion of the actuator 110. In this way, the inner wire or conduit 230 may be able to move relative to the outer conduit.

The control cable inner wire 230 may be adapted to connect to the control cable connector 240, which may, in turn, connect to the drain plug 140 at one end of the cable 120. Such a connection may be made in various appropriate ways (e.g., the drain plug 140 may include a threaded opening that fits onto a corresponding outer thread of the connector 240). At the other end of the cable, the inner wire 230 may include another control cable connector 240. Such a control cable connector may be formed by including a "Z" bend in the end of the inner wire or otherwise appropriately connecting the inner wire to the actuator controller 115. The control cable inner wire 230 may, for example, be adapted to retract into and extend outward from the cable actuator 110 when the controller 115 is rotated into the "closed" and "open" positions, respectively. The control cable actuator end 220 may be threaded so that it may screw into a cavity in the cable actuator 110. Similarly, the control cable connector 240 may be threaded into one end of the drain plug housing 130 to connect the drain plug housing to the control cable 120. The control cable connector 240 may be swaged onto (or otherwise be attached to) the control cable inner wire 230.

The control cable inner wire may connect to the cable actuator 110 and the drain plug 140 such that when the cable actuator 110 is turned to the "closed" position the drain plug 140 is pulled into the drain plug housing 130 by the control cable inner wire 230 to form a seal. When the cable actuator is turned to the "open" position the control cable inner wire 230 may cause the drain plug 140 to slide out of the drain plug housing 130 allowing water to flow through the drain plug housing. The drain plug housing and drain plug 140 may include ABS and/or any other appropriate material.

FIG. 2 also shows a drain plug receptacle (and outlet) 250 and mounting elements 260 of some embodiments. The drain plug receptacle 250 may be adapted to receive the drain plug 140 and form a water tight seal. The drain plug receptacle 250 may also act as an outlet of the cavity 135 when the drain plug 140 is in an "open" position. The mounting elements 260 may provide various appropriate ways to attach the drain plug housing 130 to a vessel (e.g., using screws, bolts, etc.). This figure also shows the drain cavity 135 included in this example.

Although the components of FIG. 2 have been described with reference to certain features, one of ordinary skill in the art will recognize that the components may be implemented in various different ways without departing from the spirit of the invention. For instance, while the outer conduit of the control cable 120 is described as including three layers with the core including nylon, the outer layer including polyethylene, and the structural layer including wire, some embodiments may include a control cable 120 with an outer conduit including more or less than three layers, and including materials other than, or in combination with, the materials stated above, which may include any suitable waterproof polymers, silicone, structural support materials, and/or other appropriate materials, etc.).

Figure 3:
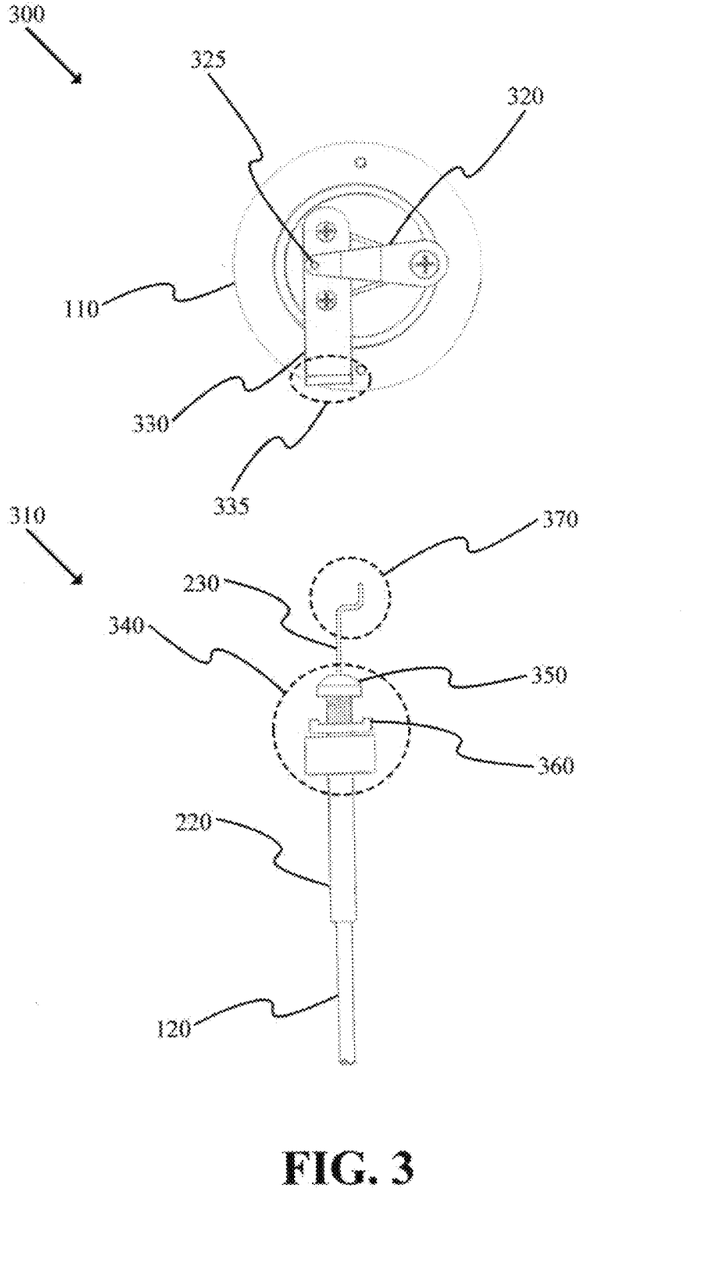
FIG. 3 illustrates a rear view of the cable actuator and a side view of an associated end of the control cable used by some embodiments of the device of FIG. 1.

FIG. 3 illustrates a rear view 300 of the cable actuator 110 and a side view 310 of an associated end of the control cable 120 used by some embodiments of the device of FIG. 1. Specifically, this figure shows various components of the cable actuator 110 and the control cable 120 that may be used to connect the cable actuator 110 to the control cable 120, and which may thus allow operation of a remote-controlled drain plug system (e.g., system 100). As shown, the actuator 110 may include an actuator arm 320 with an associated receptacle 325 (e.g., a through-hole) and a fixed retaining element 330 with an associated receptacle 335 (e.g., a notch). The end of the control cable 120 may include a fastener 340 with an end cap 350 and a locking element 360. In addition, a portion of the inner wire 230 of the control cable 120 may be formed into a "Z" bend 370.

The cable actuator 110 may be adapted such that the actuator arm 320 connects to the inner wire 230. In this example, the "Z"-bend 370 may be passed through the receptacle 325 such that the inner wire 230 moves with the actuator arm 320. The actuator arm, in turn, may be connected to the control knob 115, such that the actuator arm 320 moves with the control knob 115. The fastener 340 may be adapted such that the actuator end 220 may be held in a fixed position relative to the retaining element 330 and thus the actuator 110. In this example, the retaining element 330 may include an "L"-shaped bracket with a notched end 335 such that the end cap 350 may be placed on one side of the notched end 335 (and the threaded portion of the end cap may pass through the notch or slot) and the locking element 360 may be secured against the opposite side of the notched end 335. In this example, the locking element 360 may include a threaded receptacle that may receive an associated threaded protrusion of the end cap 350. Different embodiments may use different ways to secure the cable to the actuator (e.g., clips, clamps, pins, etc.).

In some embodiments, the actuator arm 320 and retaining element 330 may be made from appropriately rigid materials (e.g., metal, plastic), and may be fastened to the actuator 110 in various appropriate ways (e.g., screws, bolts, adhesives, etc.). Alternatively, in some embodiments, the retaining arm 330, for example, may be integrally formed with the actuator 110 (e.g., using an injection-molding process).

During operation, when a user moves the control knob 115 about a fixed axis, the actuator arm 320 may move about the same fixed axis of rotation. The movement of the actuator arm, in turn, move cause the inner wire 230 of the control cable 120 to move linearly relative to the fastener 340 and actuator end 220, which may be held in place by the retaining element 330. In such a way, when the control knob is turned in a first direction (e.g., clockwise), the actuator arm 320 may move in such a way that the inner wire 230 moves in a first direction along the control cable 120 and the drain plug 140 is extended out of the housing 130. Likewise, when the control knob 115 is turned in a second direction (e.g., counter-clockwise), the actuator arm 320 may move in such a way that the inner wire 230 moves in a second direction along the control cable 120 and the drain plug 140 is retracted into the housing 130.

Although the components of the actuator 110 have been described with reference to certain features, one of ordinary skill in the art will recognize that the components may be implemented in various different ways without departing from the spirit of the invention. For instance, while the actuator 110 is described as connecting to the control cable 120 using a "Z"-bend and through-hole, other embodiments may include various other appropriate ways to attach the actuator 110 to the control cable 120 (e.g., using bolts, clamps, etc.).

II. Method of Installation

Figure 4:
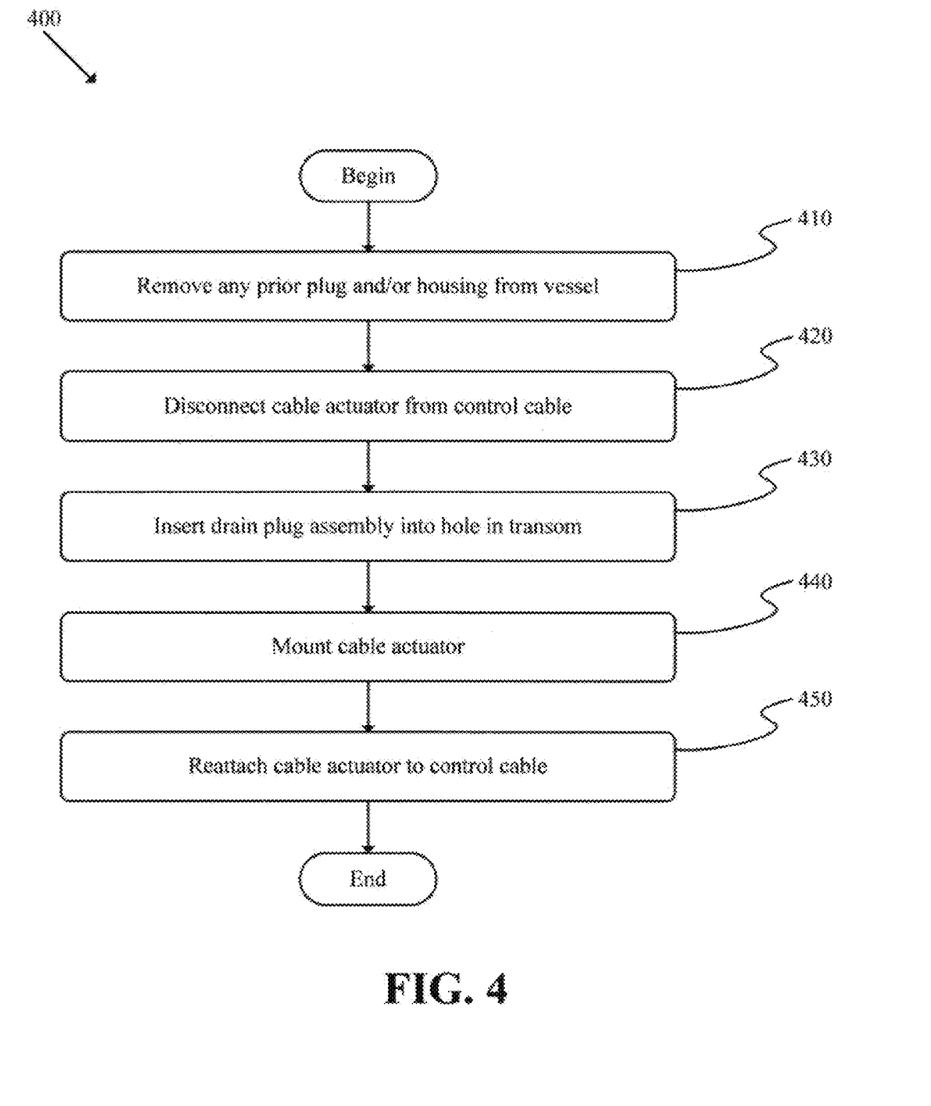
FIG. 4 illustrates a flow chart of a conceptual process used by some embodiments to install the system of FIG. 1 into a water vessel.

FIG. 4 illustrates a flow chart of a conceptual process 400 provided by some embodiments to install the device of FIG. 1. The process may begin, for example, when a user or manufacturer obtains the device for use in a water vessel. The process may be implemented using automated systems (e.g., computer-controlled robotic assembly systems).

Next, the process may remove (at 410) any prior drain plug and/or housing from the vessel. This step may not be necessary for vessels that do not include a prior drain plug or housing. If there is no existing hole in the transom, a hole may be created in an appropriate position to house the device.

The process may then disconnect (at 420) a cable actuator (e.g., cable actuator 110 described above in reference to FIGS. 1-3) from a control cable (e.g., control cable 120 described above in reference to FIGS. 1-3). As described above in reference to FIGS. 2-3, to remove the actuator 110 from the control cable 120, the actuator arm 320 may be disconnected from the "Z"-bend 370 of the inner wire 230, and the fastener 340 of the control cable 120 may be detached from the retaining element 330 of the actuator 110. Different embodiments may use different ways to secure the cable to the actuator (e.g., clips, clamps, pins, etc.).

Next, process 400 may insert (at 430) a drain plug housing (e.g., drain plug housing 130 described above in reference to FIGS. 1-2) and drain plug (e.g., drain plug 140 described above in reference to FIGS. 1-2) into a hole in the vessel's transom or any other appropriate place. The cable 120, drain plug housing 130, and drain plug 140 may be connected such that when the drain plug housing 130 is inserted into a hole in the vessel, the cable 120 and drain plug 140 pass through the hole as well. In order to make a complete seal between the hole in the vessel and the drain plug housing 130 materials such as rubber, caulk, and/or other appropriate sealants may be used.

Next, the process may mount (at 440) a cable actuator (e.g., cable actuator 110 described above in reference to FIGS. 1-3). The cable actuator may be mounted at any appropriate location in the vessel, such as the driver's console. Particular users may choose various locations in the vessel to mount the device to fit the needs of the user.

The process may then reattach (at 450) the cable actuator 110 to the control cable 120. This may be done by reconnecting the "Z"-bend 370 of the inner wire 230 to the actuator arm 320, and reattaching the fastener 340 of the cable 120 to the retaining element 330 of the actuator 110. After reattachment, the process may end. The drain plug system may then be used in the vessel to control the flow of water into and out of the vessel through the drain plug housing 130.

One of ordinary skill in the art will recognize that process 400 may be performed in various appropriate ways without departing from the spirit of the invention. For instance, the process may be performed using various different operations. In addition, the operations may be performed in various different orders. Furthermore, the process may be broken up into various sub-processes and/or performed as part of one or more macro processes, as appropriate.

III. Methods of Operation

Figure 5:
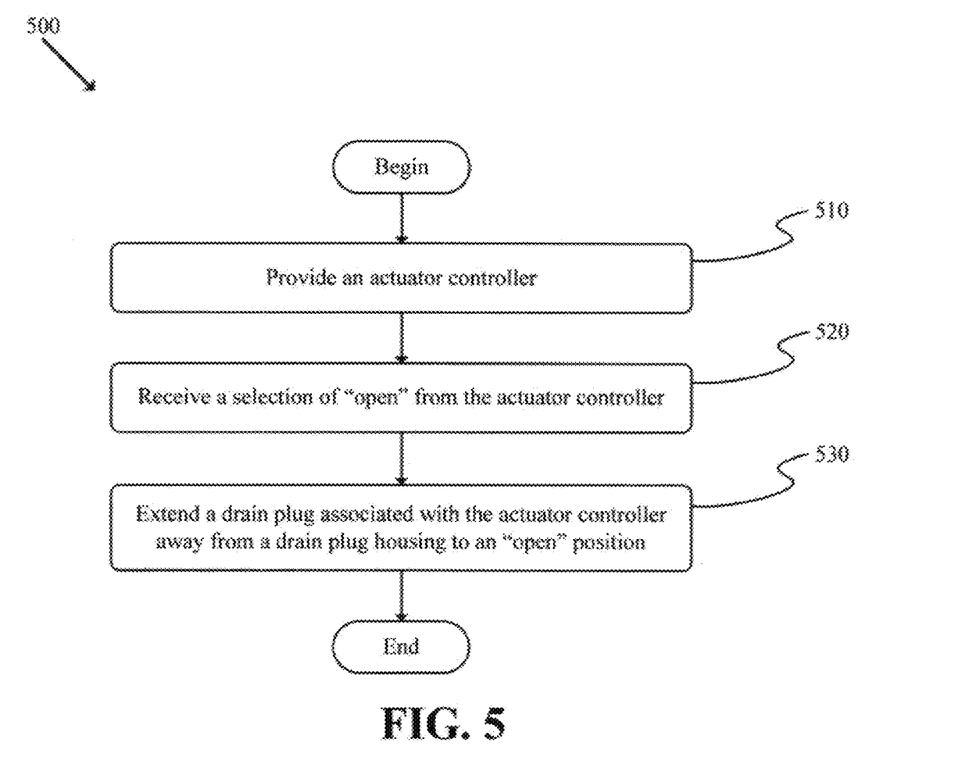
FIG. 5 illustrates a flow chart of a conceptual process used by some embodiments to provide a way of opening a drain plug of the system of FIG. 1.

FIG. 5 illustrates a flow chart of a conceptual process 500 used by some embodiments to allow operation of the system of FIG. 1. The process may begin when a vessel contains water that needs removed.

The process may provide (at 510) an actuator controller (e.g., actuator controller 115). While a control knob is described above in reference to FIG. 1 as one possible controller, different embodiments may include other types of controllers such as buttons, levers, switches, etc.

Process 500 may then receive (at 520) an input (e.g., a selection of "open") from the controller. Such an input may be received in various appropriate ways (e.g., a user may move the actuator controller to a particular position, may press one or more buttons, etc.). Next, the process may cause (at 530) a drain plug (e.g., drain plug 140) associated with the actuator controller to extend away from a drain plug housing (e.g., housing 130) to an "open" position and then end. As described above in reference to FIGS. 1-3, the drain plug may be moved in various appropriate ways (e.g., by connecting the plug and the controller to opposite ends of a cable as described above in reference to FIG. 1, by sending an electronic signal from the actuator controller to a remote actuator that causes the actuator to move to the desired position, etc.).

One of ordinary skill in the art will recognize that process 500 may be performed in various appropriate ways without departing from the spirit of the invention. For instance, the process may be performed using various different operations. In addition, the operations may be performed in various different orders. Furthermore, the process may be broken up into various sub-processes and/or performed as part of one or more macro processes, as appropriate. In addition, the process may be performed continuously in some embodiments.

Figure 6:
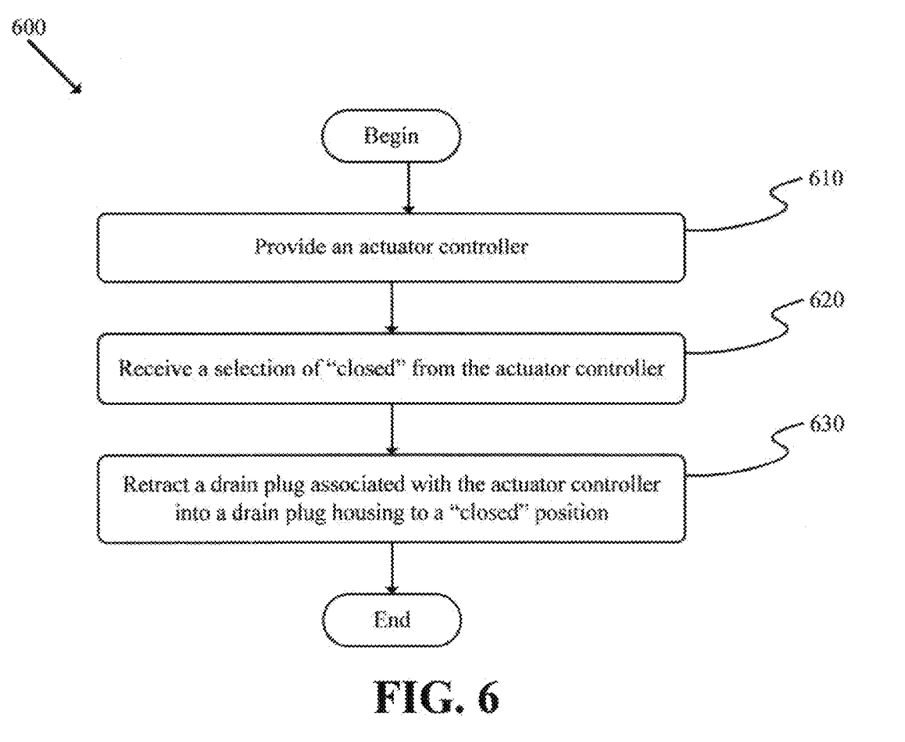
FIG. 6 illustrates a flow chart of a conceptual process used by some embodiments to provide a way of closing a drain plug of the system of FIG. 1.

FIG. 6 illustrates a flow chart of a conceptual process 600 used by some embodiments to allow an alternative operation of the system of FIG. 1. The process may begin, for example, when a vessel has released any inside water and a user wishes to seal the drain plug 140.

The process may provide (at 610) an actuator controller (e.g., actuator controller 115). Process 600 may then receive (at 620) an input (e.g., a selection of "closed") from the controller. Such an input may be received in various appropriate ways (e.g., a user may move the actuator controller to a particular position, may press one or more buttons, etc.). Next, the process may cause (at 630) a drain plug associated with the actuator controller to retract into a drain plug housing to a "closed" position and then end. As described above in reference to FIGS. 1-3, the drain plug may be moved in various appropriate ways (e.g., by connecting the plug and the controller to opposite ends of a cable as described above in reference to FIG. 1, by sending an electronic signal from the actuator controller to a remote actuator that causes the actuator to move to the desired position, etc.).

One of ordinary skill in the art will recognize that process 600 may be performed in various appropriate ways without departing from the spirit of the invention. For instance, the process may be performed using various different operations. In addition, the operations may be performed in various different orders. Furthermore, the process may be broken up into various sub-processes and/or performed as part of one or more macro processes, as appropriate. In addition, the process may be performed continuously in some embodiments.

While the invention has been described with reference to numerous specific details, one of ordinary skill in the art will recognize that the invention can be embodied in other specific forms without departing from the spirit of the invention. For example, several embodiments were described above by reference to particular features and/or components (e.g., operating a system via a control knob on the cable actuator 110, the cable actuator including ABS and brass, and the O-ring 150 including silicone, etc.). However, one of ordinary skill in the art will realize that other embodiments might be implemented with other types of features and components (e.g., operating a system via a switch, lever, and/or other appropriate mechanical device, having a cable actuator and O-ring including materials other than, or in combination with, ABS, brass, and silicone, etc.). One of ordinary skill in the art would understand that the invention is not to be limited by the foregoing illustrative details, but rather is to be defined by the appended claims.

I claim:

1. A remote drain plug system comprising:
a control cable comprising an inner wire and an outer layer;
a cable actuator coupled to a first end of the control cable, the cable actuator adapted to move the inner wire within the outer layer;
a drain plug housing coupled to a second end of the control cable;
a drain plug coupled to the inner wire at the second end of the control cable, the drain plug adapted to be able to be positioned relative to the drain plug housing; and
an actuator controller coupled to the cable actuator and the inner wire at the first end, wherein the actuator controller controls a position of the inner wire within the outer layer, wherein the actuator controller is coupled to the inner wire using a "Z" bend.

2. The remote drain plug system of claim 1, wherein a first position of the actuator controller is associated with a first position of the drain plug.

3. The remote drain plug system of claim 2, wherein the first position of the drain plug forms a water tight seal between the drain plug and the drain plug housing.

4. The remote drain plug system of claim 3, wherein a second position of the actuator controller is associated with an open drain plug.

5. The remote drain plug system of claim 4, wherein the second position of the drain plug allows water to pass through the drain plug housing.

6. The remote drain plug system of claim 5, wherein the second position of the drain plug opens an outlet of the drain plug housing.

7. The remote drain plug system of claim 1, wherein the drain plug is coupled to the inner wire using a threaded connector.

8. The remote drain plug system of claim 1, wherein the drain plug includes a silicone O-ring.

9. The remote drain plug system of claim 1, wherein the control cable comprises a structural support layer.

10. The remote drain plug system of claim 1, wherein the drain plug housing comprises at least one inlet and an outlet that are integrally formed with a cavity of the drain plug housing.

11. The remote drain plug system of claim 10, wherein the at least one inlet is adapted to receive water and the outlet is adapted to expel water.

12. The remote drain plug system of claim 11, wherein the outlet is adapted to form a water-tight seal with the drain plug when the drain plug is in a first position, and to allow water to flow through the outlet when the drain plug is in a second position.

13. The remote drain plug system of claim 1, wherein the drain plug housing includes a circular outlet adapted to receive a portion of the drain plug.

14. The remote drain plug system of claim 13, wherein the drain plug includes an O-ring adapted to form a compression seal within the circular outlet.

\* \* \* \* \*